United States Patent [19]

Peterson

[11] Patent Number: 4,753,151
[45] Date of Patent: Jun. 28, 1988

[54] SELF-RETRACTING BALLISTIC ACTUATOR SYSTEM

[75] Inventor: Paul F. Peterson, Rancho Palos Verdes, Calif.

[73] Assignee: Lockheed Corporation, Calabasas, Calif.

[21] Appl. No.: 879,705

[22] Filed: Jun. 27, 1986

[51] Int. Cl.$^4$ .......................... B64D 1/02; F41F 5/02
[52] U.S. Cl. ..................................... 89/1.14; 60/638; 244/137.1; 294/82.29
[58] Field of Search ................. 89/1.14, 1.57; 60/632, 60/634, 636; 294/82.26, 82.29; 244/137 A

[56] References Cited

U.S. PATENT DOCUMENTS

| | | | |
|---|---|---|---|
| 2,857,890 | 10/1958 | Stott | 60/638 |
| 2,877,750 | 3/1959 | Maier | 60/638 |
| 2,925,011 | 2/1960 | Musser et al. | 89/1.14 |
| 3,034,289 | 5/1962 | Stott et al. | 294/82.29 X |
| 3,104,521 | 9/1963 | Sawyer et al. | 89/1.14 X |
| 3,109,283 | 11/1963 | Sawyer | 60/638 |
| 3,149,456 | 9/1964 | Sterrett | 60/638 X |
| 3,218,927 | 11/1965 | Stott | 294/82.29 X |
| 3,756,545 | 9/1973 | Coutin | 244/137 X A |
| 4,034,816 | 7/1977 | Lutich et al. | 60/638 X |
| 4,088,287 | 5/1978 | Hosquenoph et al. | 244/137 A |
| 4,257,639 | 3/1981 | Stock | 89/1.14 X |

*Primary Examiner*—David H. Brown
*Attorney, Agent, or Firm*—Louis L. Dachs

[57] ABSTRACT

The actuator system comprises an actuator which includes a cylinder having a first end adapted to receive one or more gas generators and a second end having an opening therethrough. A piston having first and second ends defining the length thereof is movably mounted in the cylinder, dividing the cylinder into first and second variable volume chambers. The piston includes a piston rod attached thereto which extends out through the opening of the second end of the cylinder. An accumulator is coupled by a first passage system to the second variable volume chamber at substantially the second end of the cylinder. A first sequencing system provides for the charging of the accumulator and second chamber after a portion of the stroke. As the piston continues, the gas in the second chamber compresses, building up pressure and slowing the piston down. Near the end of the stroke, a second sequencing system vents the first chamber overboard and when the piston reaches the second end of the cylinder the gas in the accumulator is used to drive the piston back to the retracted position.

6 Claims, 2 Drawing Sheets

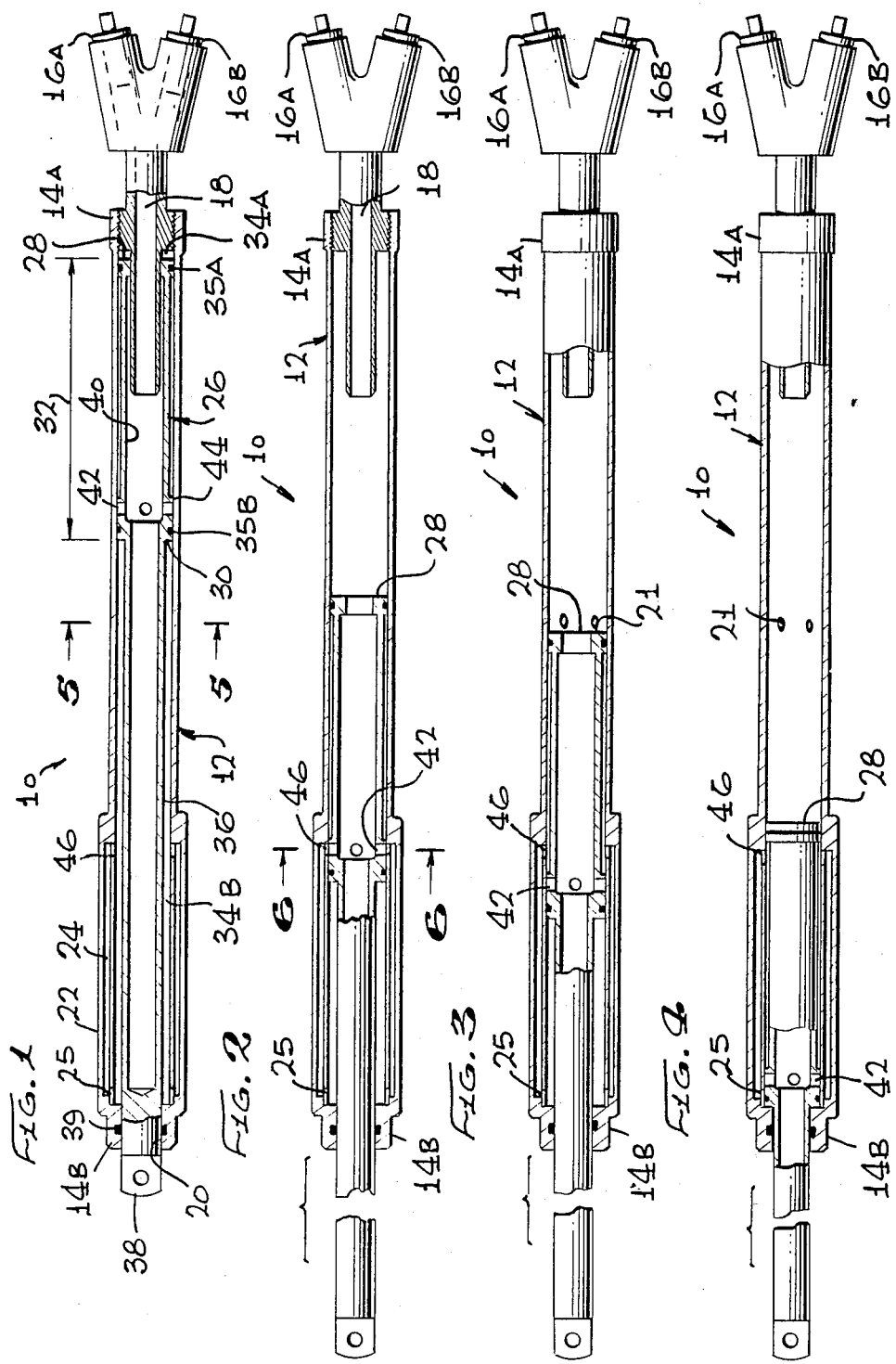

SELF-RETRACTING BALLISTIC ACTUATOR SYSTEM

TECHNICAL FIELD

The invention relates to the field of actuators and, in particular, to an explosively powered actuator.

BACKGROUND INFORMATION

Explosively powered actuators have many advantages which include providing a large amount of power from a small package, high reliability, and very rapid response time. The main disadvantages are that such devices are single shot, i.e., once activated they cannot be recycled until a new cartridge is installed. Another disadvantage is that the rapid and high energy output sometimes requires snubbing devices to be used in order to reduce the output force near the end of the stroke. An example of an explosively powered actuator can be found in U.S. Pat. No. 4,257,639 "Ejector Device for Stores" by W. H. Stock. Here, the explosives are used to sequentially retract a safety locking collar and, thereafter, to forcibly eject a weapon from an aircraft. Here, as in most explosive devices, springs compressed during the actuation stroke are used to bring the actuator back to its initial position. While springs are fine for small weapon ejectors as above-described they can become quite large if used to return a large weapon dispensing system such as disclosed in applicants' co-pending patent application Ser. No. 857,004 "Weapon Dispensing System". Here is a large four bar linkage system with one of the bars being a mounting rack for a missle ten feet or longer in length and it can be readily seen that any return springs would be quite large. Thus, it would be desirable to have such a weapon dispensing system automatically return without the use of springs. Of course, a second explosive cartridge or a stored gas system or even a hydraulic or pneumatic system could be used. But, some of the main advantages of the use of explosive actuators would be lost, i.e., low weight and simplicity.

Thus, it is a primary object of the subject invention to provide an explosively powered actuator that automatically returns to its initial position.

It is another object of the subject invention to provide an explosively powered actuator which also uses the gases produced for actuation foC retraction.

It is a still further object of the subject invention to provide an explosively powered actuator which uses the actuation gases for snubbing at the end of the power stroke.

DISCLOSURE OF THE INVENTION

The invention is a self-retracting ballistic actuator system which uses the gases generated from the power stroke for snubbing at the end of the stroke and, additionally, to return the actuator to its retracted position. In detail, the actuator system comprises a hollow cylinder having a first end adapted to receive one or more explosively actuated gas generators and a second closed off end with an opening therein for a piston rod. A piston having first and second ends with a specific length is movably mounted within the cylinder from the first end to the second end thereof; and, therefore, divides the cylinder into first and second variable volume chambers. Attached to the piston is the piston rod which extends out the opening in the second end. An accumulator is mounted to the cylinder having a first passage means coupled to the second variable volume chamber substantially at the second end of the cylinder. A second passage means is coupled by a first end to the accumulator and by its second end to the interior of the cylinder at a first intermediate point between the first and second ends thereof. The piston incorporates a third passage means coupling the first variable volume chamber to the side of the piston in contact with the wall in such a manner that, as the piston moves from the first end to the second end of the cylinder, the third passage means becomes aligned with the second passage means wherein the accumulator becomes charged. A fourth passage means, located between the first end of the cylinder and the second passage means, couples the interior of the cylinder overboard.

In operation, when the gas generators are ignited, the gas pressure rapidly builds up in the first variable volume chamber driving the piston toward the second end of the cylinder. As previously mentioned, the length of the piston and the location of the second and third passage means are such that the passage way in the piston is coupled to the second passage means prior to the piston uncovering the fourth passage means. Thus, the hot gases are directed into the accumulator and into the second variable volume chamber as the piston is being driven towards the second end of the cylinder. Since the effective area on the first side of the piston is greater than the second side (the cross-sectional area of the piston rod is subtracted) the piston continues to move toward the second end. After the accumulator has been charged, the piston uncovers the fourth passage means and gases in the first variable volume chamber start to vent overboard. At the same time, due to the compression in the second variable volume chamber, pressure rises therein causing the piston to be slowed down (snubbed). By the time the piston has reached the second end of the cylinder the gas pressure in the first chamber has been significantly reduced. Since the continued movement of the piston has sealed off the second passage means, the pressurized gas in the accumulator now drives the piston back into the first end. As the piston moves back into contact, the fourth passage means is again sealed off.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

BRIEF DESCRIPTION OF THE DRAWINGS

Illustrated in FIG. 1 is a cross-sectional view of the actuator shown in the retracted position.

Illustrated in FIG. 2 is a cross-sectional view of the actuator in the partially extended position wherein the accumulator is being charged.

Illustrated in FIG. 3 is a cross-sectional view of the actuator after the accumulator has been charged.

Illustrated in FIG. 4 is a cross-sectional view of the actuator shown in the fully extended position.

Figure 5:
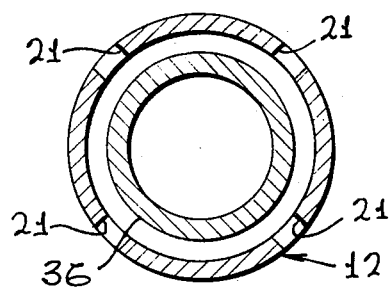

Illustrated in FIG. 5 is a cross-sectional view of the actuator shown in FIG. 1 taken along the line 5—5.

Figure 6:
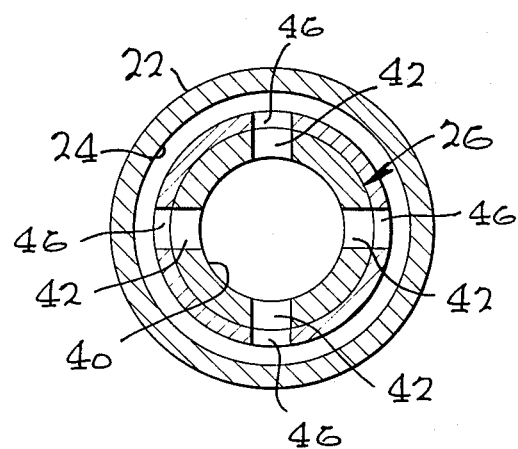

Illustrated in FIG. 6 is a cross-sectional view of the actuator shown in FIG. 2 taken along the line 6—6.

BEST MODE FOR CARRYING OUT THE INVENTION

Illustrated in FIG. 1 is a cross-sectional view of the actuator, generally designated by numeral 10 in the retracted position, wherein the actuator comprises a hollow tubular cylinder 12 having a closed off first end 14A. The first end 14A incorporates a pair of explosively actuated gas generators 16A and 16B coupled to the interior of the cylinder by passage 18. The cylinder 12 has a closed off second end 14B having an opening 20 therein. Still referring to FIG. 1 and additionally to FIG. 5 which is a cross-sectional view of FIG. 1 taken along the line 5—5, it can be seen that the cylinder 12 incorporates a plurality of holes 21 (four are shown) angularly spaced around the circumference thereof. Mounted about the cylinder 12 is an accumulator 22 having an interior volume 24 which is coupled to the interior of the cylinder by holes 25 located substantially at the second end 14B.

Sidely mounted within the cylinder 12 is a piston 26 having a first end 28 and a second end 30 with a specific length indicated by numeral 32. The piston 26 effectively divides the cylinder 12 into first and second variable volume chambers 34A and 34B, respectively. The piston 26 incorporates first and second sealing asemblies 35A and 35B which seals off the first and second chambers from each other. Attached to the second end 30 of the piston 26 is a piston rod 36 which extends out through the opening 20 at the second end 14B and terminates in an attaching lug 38. The opening 20 incorporates a sealing assembly 39 in contact with the piston rod 36 sealing off the chamber 34A from the exterior of the cylinder. The piston 26 and piston rod 36 have an internal bore 40. Also included are holes 42 coupling the bore 40 to the exterior surface 44 of the piston 26.

Still referring to FIG. 1 and additionally to FIG. 6 which is a cross-sectional view of the actuator shown in FIG. 2, in the partially extended position it can be seen that the holes 42, of which there are four, are evenly spaced about the piston 26. The holes 42 in the piston 26 are aligned with a plurality of holes 46 (equal in number to holes 42) in the cylinder 12 when the piston is in the intermediate position shown, such that the flow of gases in the first variable volume chamber 34A can enter the accumulator 22. The holes 42 and 46 are angularly spaced about the peripheral of the cylinder and piston, respectively, with respect to holes 21 (best seen in FIG. 5).

Now referring to all the FIGS. (1 through 6) in operation, when the explosively actuated gas generators 16A and 16B are ignited, gas pressure rapidly builds up in the first variable volume chamber 34A forcing the piston 26 towards the second end 14B. At the point where the piston 26 reaches the position as shown in FIG. 2, holes 42 in the piston 26 become aligned with the holes 46 in the cylinder 12 thus allowing the gases from the first variable volume chamber 34A to enter the interior 24 of the accumulator 22. The gas will very rapidly fill the accumulator 22 and enter the second variable volume chamber 34B through the holes 25 at the second end 14B of the cylinder pressurizing the second end 30 of the piston 26. Thus, holes 42 in the piston 26 and the holes 46 in the cylinder 12 are a first sequencing means for coupling the gas in the first variable volume chamber 34A to the accumulator 22. The piston 26, however, will continue to move because the effective area on first end 28 is greater than the effective area on second end 30 (the cross-sectional area of the piston rod must be subtracted therefrom).

The piston 26 continues to travel toward the second end 14B and when the piston reaches the position shown in FIG. 3, holes 21 in the cylinder 12 are uncovered allowing the gases in the first variable volume chamber 34A to vent. At this point, the holes 42 in the piston 26 again become misaligned with holes 46 in the cylinder and thus, gas pressure in the accumulator 22 and the second variable volume chamber 34B remain intact. Thus, the hole 21 and the distance the piston 26 travels and after uncovering the hole 21 defines a second sequencing means for coupling the gas in the first variable volume 34A overboard. With the pressure decaying in the first variable volume chamber 34A and the build up of pressure in the second variable volume chamber 34B, (and loads attached thereto such as the "Weapon Dispensing System" as disclosed in applicant's co-pending patent application Ser. No. 857,004), the piston 26 starts to slow down (becomes snubbed) as pressure builds up due to compression and by the time the piston 26 reaches the second end 14B (shown in FIG. 4) it has rapidly decelerated. At this point, the still pressurized gas in the accumulator 22 will force the piston 26 back toward the first end 14A of the cylinder 12 and which will rapidly reach the retracted position shown in FIG. 1.

Thus, it can be readily seen that the above actuator can achieve a high output force, automatic snubbing, and automatic retraction with no additional moving parts or additional explosive cartridges. Furthermore, by proper selection of the piston areas, cylinder volumes, etc. actuation, deceleration, and retraction can be varied.

While the invention has been described with reference to a particular embodiment, it should be understood that the embodiment is merely illustrative as there are numerous variations and modifications which may be made by those skilled in the art. Thus, the invention is to be construed as being limited only by the spirit and scope of the appended claims.

INDUSTRIAL APPLICABILITY

The invention has applicability in any system requiring an explosively powered actuator.

I claim:

1. A self-retracting ballistic actuator system comprising:
   an actuator comprising:
     a cylinder having a closed off first end adapted to receive a gas generator and a closed off second end having an opening therethrough; and
     a piston having first and second ends defining the length thereof movable from said first to said second ends of said cylinder dividing said cylinder into first and second variable volume chambers, said piston having a piston rod attached to said second end thereof and extending out through said opening in said second end of said cylinder;
   an accumulator;
   first passage means coupling said accumulator to said second variable volume chamber at substantially said second end of said cylinder;
   first sequencing means for coupling said first variable volume chamber to said accumulator over a first specific portion of distance between said first and second ends of said cylinder; and second sequencing means for coupling said first variable volume chamber overboard over a second specific portion of the distance between said first and second ends of said cylinder.

2. The system as set forth in claim 1 wherein said first and second sequencing means are positioned to couple said first variable volume chamber to said accumulator prior to coupling said first variable volume chamber overboard.

3. The system as set forth in claim 2 wherein said first and second specific portions of the distance occur in order.

4. The system as set forth in claim 3 wherein said first and second specific portions of the distance do not overlap.

5. The system as set forth in claim 4 wherein said first sequencing means comprises:

a second passage means coupling the interior of said cylinder to said accumulator; and a third passage means mounted in said piston coupling said first variable volume chamber to the side thereof, said third passage means alignable with said second passage means when said piston traverses said first specific distance.

6. The system as set forth in claim 5 wherein said second sequencing means comprises:

a fourth passage means coupling the interior of said cylinder overboard; and said second discreet portion of said distance is that distance the piston travels from said first end to said second end after the first end of the piston is aligned with said fourth passage means.

* * * * *